United States Patent [19]

Hemens et al.

[11] 4,014,136
[45] Mar. 29, 1977

[54] MEANS FOR THE OPENING AND CLOSING OF ANGULARLY MOVABLE PANELS

[75] Inventors: James Frederick Hemens, Billericay; Alan John Eastty, Shoeburyness, both of England

[73] Assignee: Teleflex Morse Limited, Basildon, England

[22] Filed: July 10, 1975

[21] Appl. No.: 594,919

[30] Foreign Application Priority Data

July 18, 1974 United Kingdom ............. 31961/74
Mar. 7, 1975 United Kingdom ............... 9675/75

[52] U.S. Cl. ................................. 49/325; 74/606 R
[51] Int. Cl.² ........................................ E05F 11/03
[58] Field of Search ..................... 49/324, 325, 356; 74/110, 606, 611

[56] References Cited

UNITED STATES PATENTS

| 3,434,366 | 3/1969 | Raso et al. ...................... 74/606 X |
| 3,610,055 | 10/1971 | Parris ............................. 74/606 X |

FOREIGN PATENTS OR APPLICATIONS

| 1,091,528 | 11/1967 | United Kingdom ................. 49/325 |
| 1,108,133 | 3/1968 | United Kingdom ................. 49/324 |

Primary Examiner—Kenneth Downey
Attorney, Agent, or Firm—James C. Wray

[57] ABSTRACT

A mechanism for opening and closing an angularly movable panel, comprising a drive box for attachment to a fixed frame, the drive box housing a cable wheel rotatable upon translation of a control cable when in operative association therewith, a chaincase having a sprocket operatively connected with a chain located in a casing, the chain being for attachment at one end to an angularly movable panel, rotation of the sprocket effecting translation of the chain into, or out of, the casing in accordance with the sense of sprocket rotation, the chaincase being mountable in any of four different positions on the drive box.

19 Claims, 18 Drawing Figures

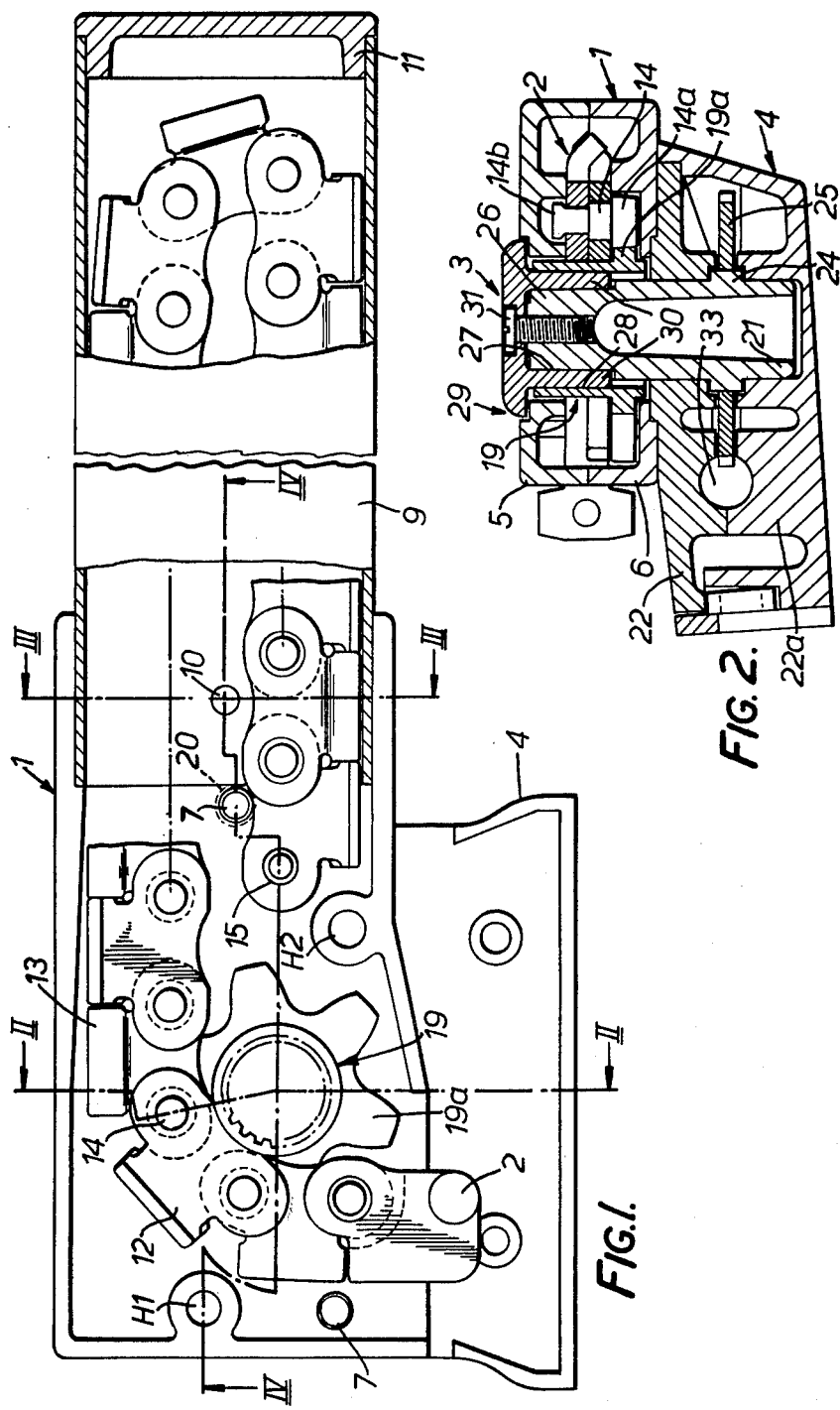

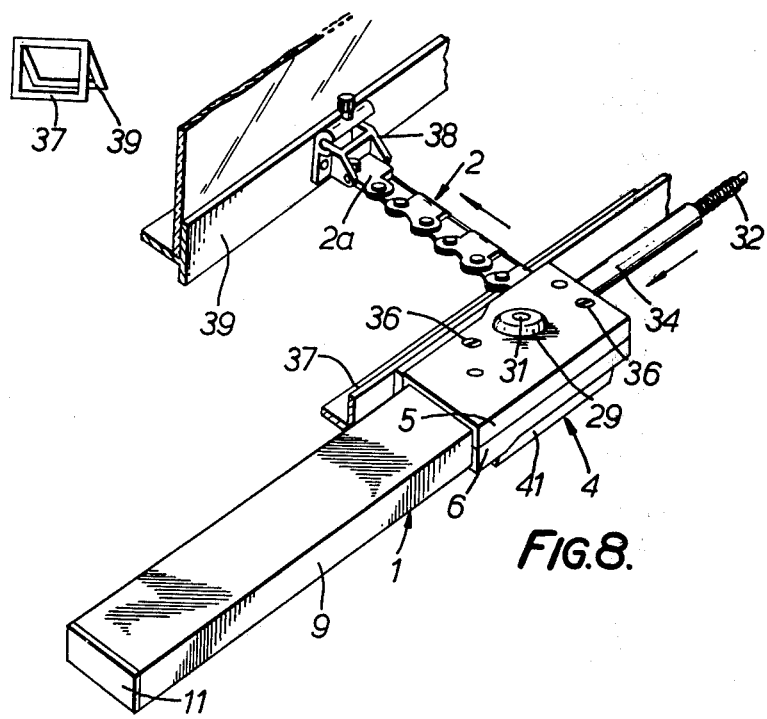
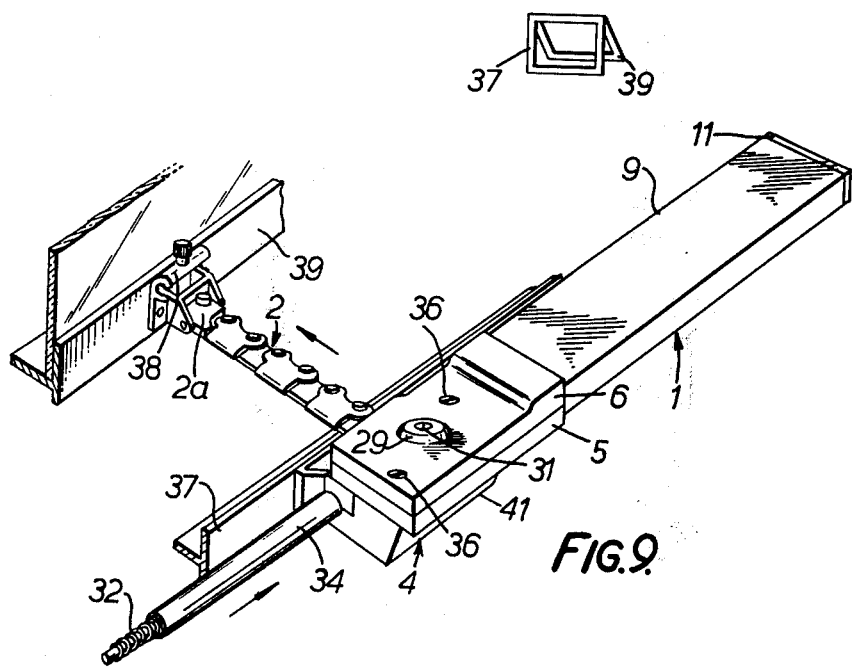

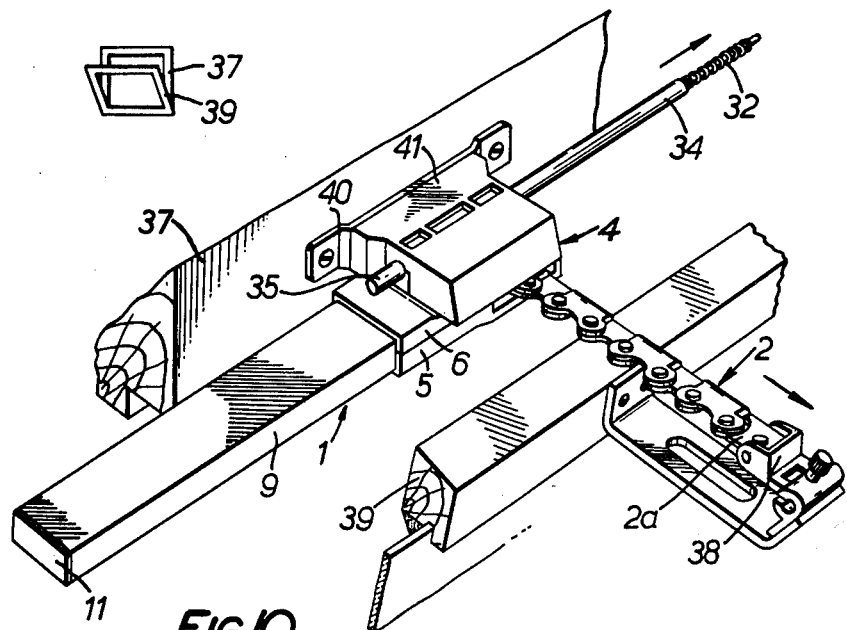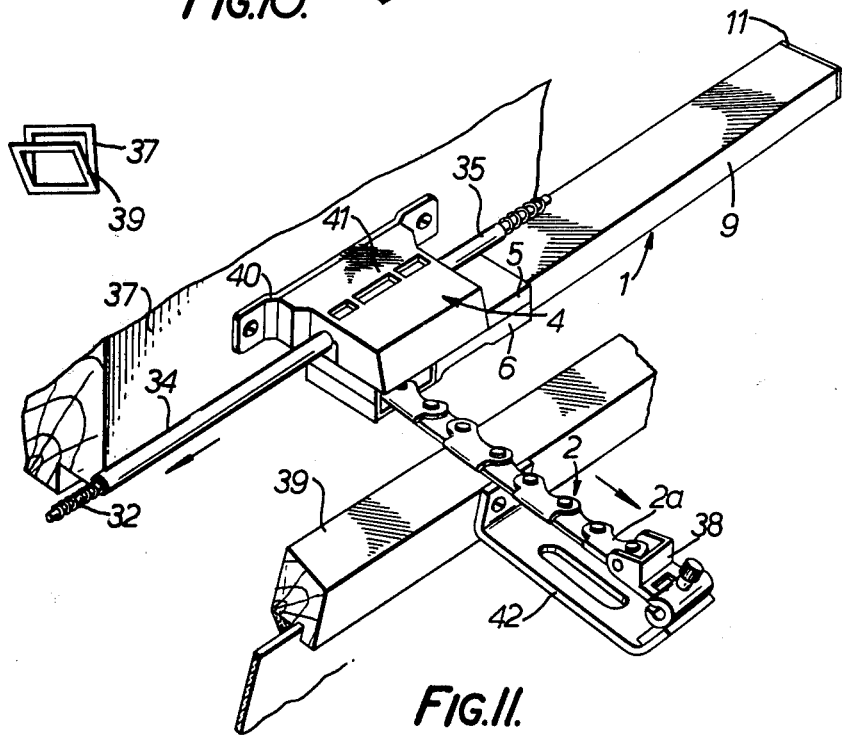

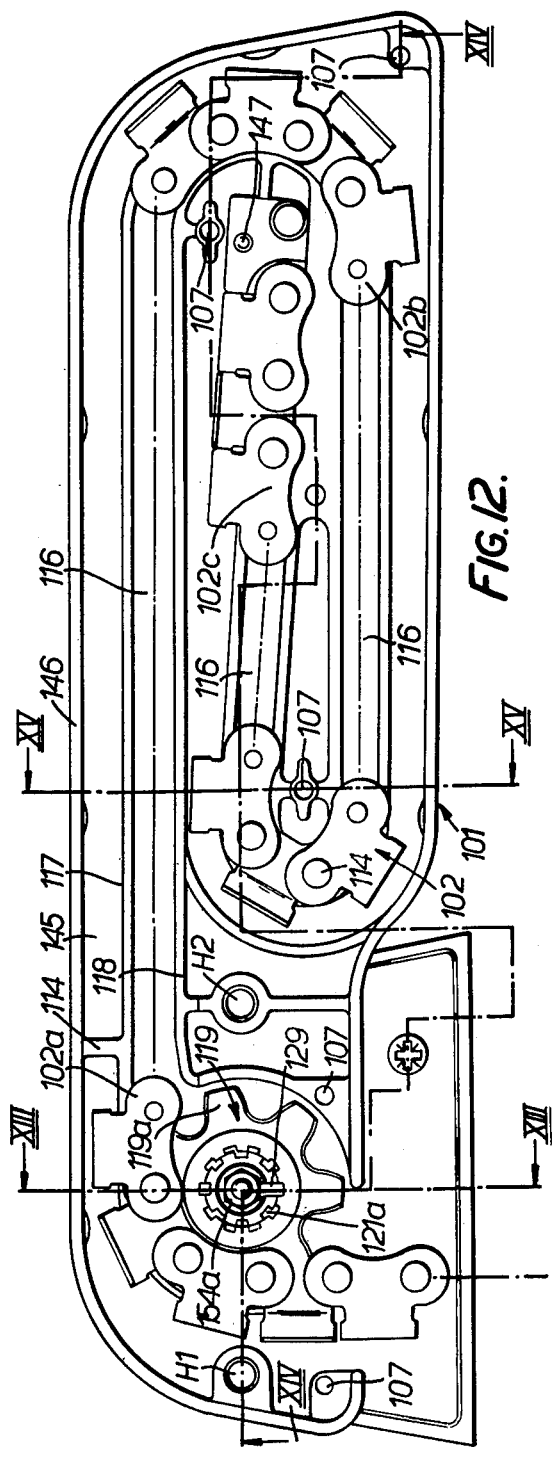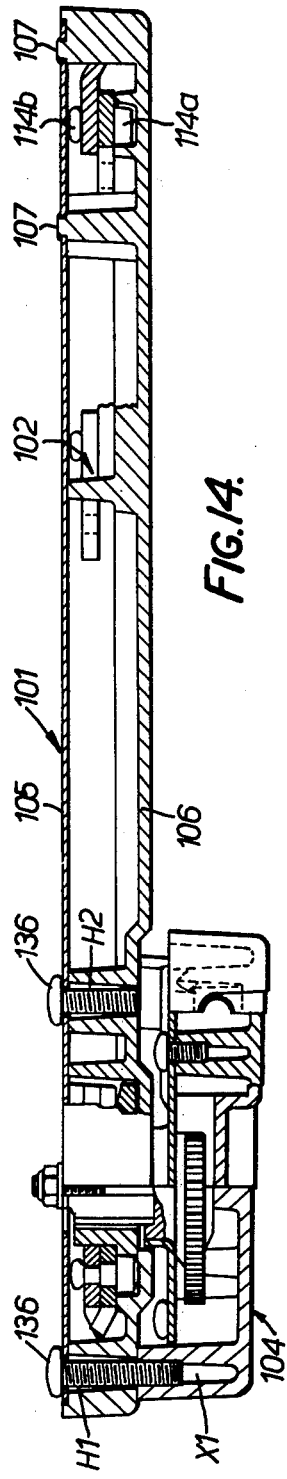

MEANS FOR THE OPENING AND CLOSING OF ANGULARLY MOVABLE PANELS

This invention relates to means for the opening and closing of angularly movable panels, for example windows, louvres, doors, traps, vents and the like which are associated with a fixed frame and which turn on a fixed or moving axis in such a way that the angle of the panel changes as it opens.

The invention has particular, (but as will be understood from the above) not exclusive, application to the opening and closing of windows mounted for swinging movement about a fixed axis, and will, hereafter, be described in that context.

The United Kingdom patent No. 1,091,528 of Teleflex Products Limited has as its subject matter a mechanism for opening and closing such windows. The embodiments of the present invention to be described are of the same general character as that mechanism but incorporate certain improvements thereover as will become apparent to those skilled in the art to which attention is directed to the earlier patent whose subject matter is thereby incorporated herein.

In order that the invention may be well understood there will now be described some embodiments thereof, given by way of example only, reference being had to the accompanying drawings, in which:

FIG. 1 is a plan view of a window opening and closing assembly with certain parts thereof removed to show the interior of the assembly;

FIG. 2 is a section along line II—II of FIG. 1 when the assembly is complete;

FIGS. 8 to 11 show the window opening and closing assembly of the preceding figures in four different conditions of use;

FIG. 12 is a plane view of an alternative window opening and closing assembly with certain parts thereof removed to show the interior of the assembly and arranged for use with a top hung window with the drive box directly mounted on the fixed frame thereof and with the chaincase extending to the left;

FIG. 14 is a section along line XIV—XIV of FIG. 12;

In the various figures, like parts are denoted by like references. Also, those parts in FIGS. 12 to 18 having functional counterpart in FIGS. 1 to 11, although not necessarily of precisely the same shape as shown therein, will be indicated by like reference numerals increased by 100.

Figure 3:
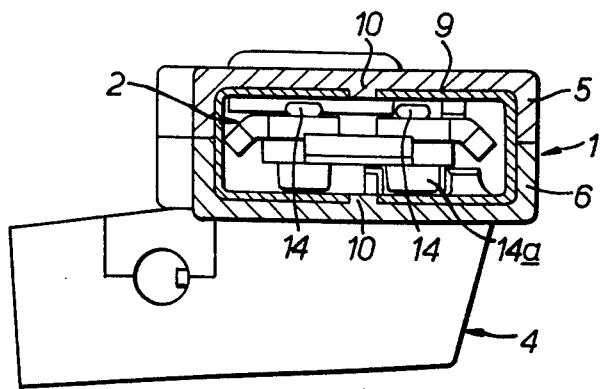
FIG. 3 is a section along line III—III of FIG. 1 again when complete.

Referring first to FIGS. 1 to 7, the assembly includes a permanently assembled chaincase 1 with a stored drive chain 2 and sprocket drive unit 3 therein, which can be selectively mounted in any of four positions (see FIGS. 8 to 11 to which reference will be particularly made later) on a drive box 4.

The chaincase 1 has generally similar upper and lower case sections 5 and 6 respectively which are secured to each other by a pair of rivets 7 on the latter section being peened over within a countersunk hole 8 in the upper section. Additionally, the chaincase 1 includes an elongate housing 9 which is open at its inner end there to be secured within the assembled case sections 5, 6 by lugs 10 thereon registering in apertures in the housing, the outer end of which is closed by a plug 11. Preferably, the case sections 5, 6 are die castings, and the housing 9 an aluminium extrusion.

The drive chain 2 is preferably constructed in like manner to that of the first embodiment of U.S. Pat. No. 1,091,528, thus having a plurality of alternate links 12, 13 each of which is pivotally attached to its neighbouring links by rivets 14 and so fashioned and arranged that the chain cannot be hinged in one direction about those rivets beyond a straight line configuration. A fuller description of the chain is to be found in the specification of the aforementioned patent.

The chain 2 differs from that in the earlier patent in that the terminal link at its inner end is not a 'special' end link but rather is a standard link 12 or 13 which is mounted in its last 'rivet' hole upon a post 15 integral with an upstanding from the lower case section 6 and received within a hollow depending lug 15a on the upper case section 5. Thus, the inner end of the chain is anchored against withdrawal from the chaincase 1.

It has, also, been found not to be necessary to provide a guideway within which the chain runs completely along its path of travel within the chain case. Rather, a short guideway within the case sections 5, 6 is sufficient. Such guideway is identified in FIG. 6 by reference 16 and is defined between walls 17, 18 integral with the lower case section 6, the guideway accommodating heads 14a of the rivets 14 and leading the chain along a path tangential to the teeth 19a of a sprocket 19 so that those rivet heads are engaged by such teeth as the sprocket is turned whereby the chain is driven out of or wound back into the chaincase 1.

A similar and oppositely disposed guideway 16a is defined between walls 17a, 18a integral with the upper case section 5 to receive the rivet ends 14b.

The shank 20 of that rivet 7 which is adjacent the post 15 serves as a guide around which the chain 2 is trained when fully wound out of the chaincase 1. The outer end of the chain 2 is attached by means to be later described to the movable frame of a window, the chaincase itself being mounted to the fixed frame, so that translation of the chain serves to open or close the window, as the case may be.

The chaincase 1, as has been said, can be mounted in different positions upon the drive box 4. The means by which the chaincase can be selectively secured in any of four positions on the drive box will be later described, it being the construction of the drive box which is the present concern. It is sufficient now to say that however the chaincase is operatively mounted upon the drive box, the sprocket 19 (which is journalled for rotation in the assembed case sections 5, 6 . . . and which has "open" drive teeth 19a rather than teeth blanked off on one side by a disc as in the aforementioned patent) can be engaged to a drive means forming part of the drive box 4.

Such drive means comprises a tubular member 21 journalled for rotation in the drive box 4. More particularly, the drive box comprises upper and lower housings 22, 22a which are held together by screws (not shown) . . . preferably of the self-tapping kind . . . engaging in registered holes 23 in those housings. The tubular member 21 is journalled in both housings 22, 22a and has an intermediate shank portion 24 on which is mounted, so as to be fast for rotation therewith, a drive pinion 25 having involute gear teeth. Thus, the shank portion 24 may have any suitable non-circular cross-section, hexagonal being particularly suitable, and the drive pinion 25 would have a bore of complementary cross-section so as to receive the shank portion as a sliding fit.

The upper end 26 of the tubular member 21 projects into the chaincase 1 and is drivingly attached to the sprocket 19 by means enabling an incremental rotational adjustment of one such component relative to the other to be performed. Such means are similar in construction to the incremental adjustment means featured in the embodiment of FIGS. 7 and 8 in our co-pending United Kingdom application No. 22730/72 to which attention is directed.

Thus, the outer periphery 27 of the tubular member upper end 26 is provided with a series of rectangular grooves 27a (FIG. 4), and the inner periphery 28 of the sprocket 19 which is hollow and into which the end 26 projects has a plurality of similar rectangular grooves (28a). A coupling member 29 has diametrically opposite square section pegs 30 which locate within the two pairs of grooves which would have been aligned with one another during the adjustment procedure (it will have been appreciated that until the coupling member is located in position the drive pinion 25 and the sprocket 19 can be rotated relative to one another) and so lock the two rotational components together for rotation as one. The coupling member 29 is held in position by being engaged by a screw 31 to the tubular member 26.

In the present embodiment, a push-pull cable remote control mechanism is used to drive the drive pinion 25 and hence translate the chain 2. Thus, a helically wound cable core 32 (see FIGS. 8 to 11) meshes with the pinion 25, being led thereto through a straight channel 33 (see FIG. 7) fashioned in the upper and lower housings 22, 22a of the drive box 4. The cable core is guided within an outer casing 34 which is clamped at least at its ends (an end being clamped between the housings 22, 22a at the input of the channel 33 therein) so that the core will linearly displace therein upon the application of a compressive or tensile force thereon. Preferably, the outer casing would constitute an inner plastics tube around which is a lay of helical wires encased by an outer plastics sleeve. Preferably, also, the core is of the multi-strand type with or without one or more compression transmitting lays wound thereon and having on its exterior single or multi-start helices. A spent travel tube 35 would be provided, clamped also between the housings 22, 22a at the output of the channel 33 therein. Translation of the cable core 32 causes rotation of the drive pinion 25. Any suitable drive mechanism can be used to drive the cable core in either direction, and reference may be had to U.S. Pat. No. 1,091,528 for examples thereof.

The means (and the purpose) for securing the chaincase 1 in any of four positions on the drive box 4 will now be described. It should, first, however, be understood that window opening mechanisms of the kind of present concern are required for use both with windows both of the bottom hung and top hung type. Not only that, but also for use with push-pull remote control mechanisms of which the helically wound inner cable approaches the window opening and closing assembly from the right hand or left hand side. The present assembly can be simply adapted for all four requirements, the adaptation not requiring the chaincase 1 to be disassembled as is necessary with the construction of U.S. Pat. No. 1,091,528. On the contrary, the chaincase remains for all uses a permanently assembled unit.

The 'secret' lies in the four mounting positions available to the chaincase 1 on the drive box 4. For such mounting, the chaincase has two holes H1, H2 extending through its case sections 5, 6. The drive box 4 has four pairs of holes extending through its upper housing 21 and into its lower housing 22. Matched pairs of such holes have the same reference letter and with a numeral suffix the same as that of the chaincase hole which will be in register when the chaincase is positioned on the drive box. The holes in register then receive a pair of self-tapping screws 36 by which the chaincase and drive box are held together.

Figure 7:
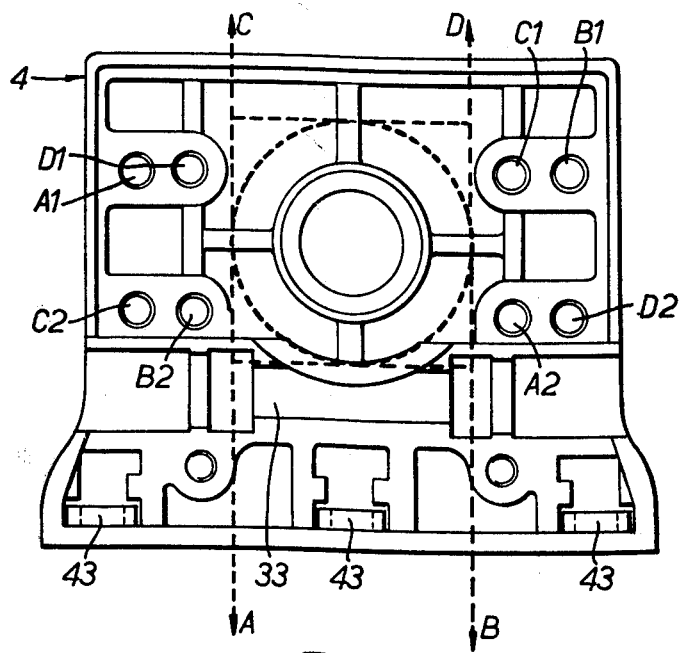
FIG. 7 is a plan view of the casing of a drive box of the same assembly.
Figure 4:
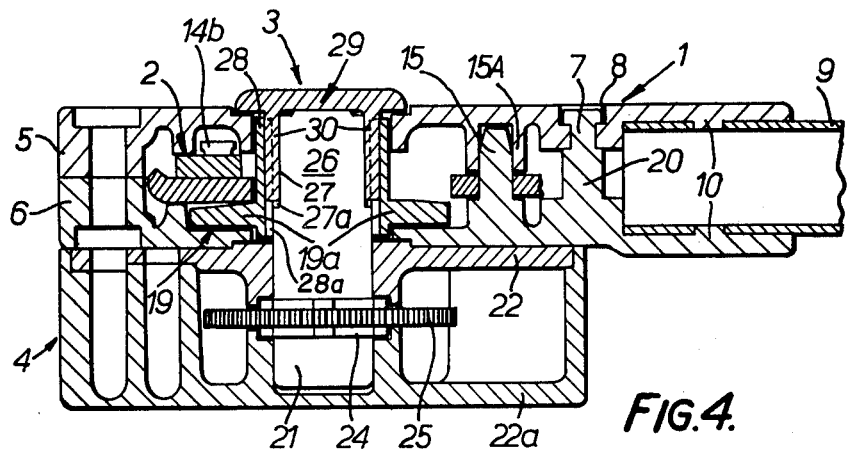
FIG. 4 is a section along line IV—IV of FIG. 1 when complete.
Figure 5:
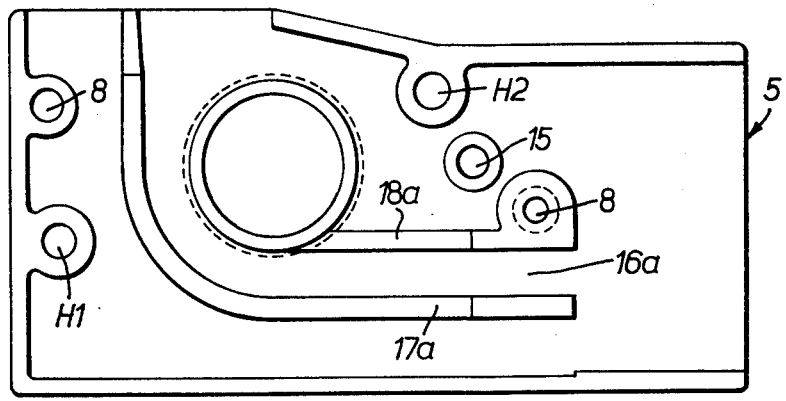
FIGS. 5 and 6 are plan views of upper and lower chain cases respectively of the same assembly.
Figure 6:
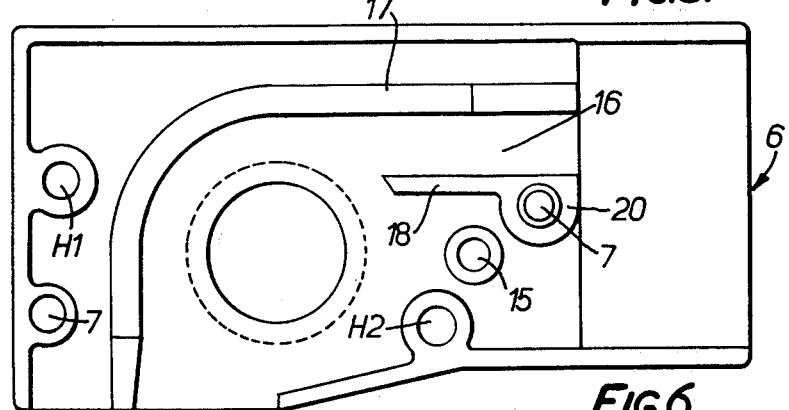
Figure 13:
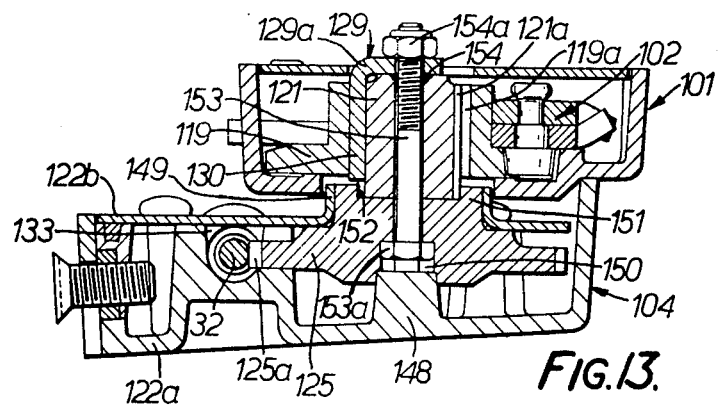
FIG. 13 is a section along line XIII—XIII of FIG. 12.
Figure 15:
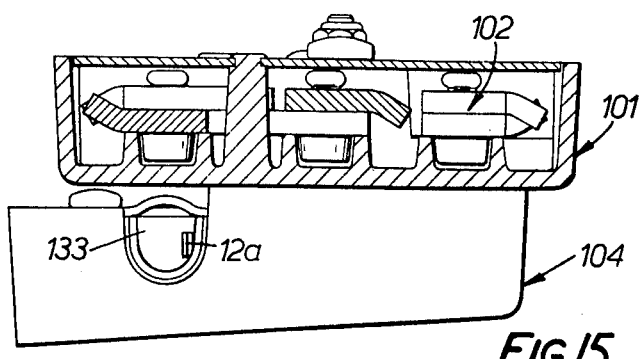
FIG. 15 is a section along line XV—XV of FIG. 12.
Figure 16:
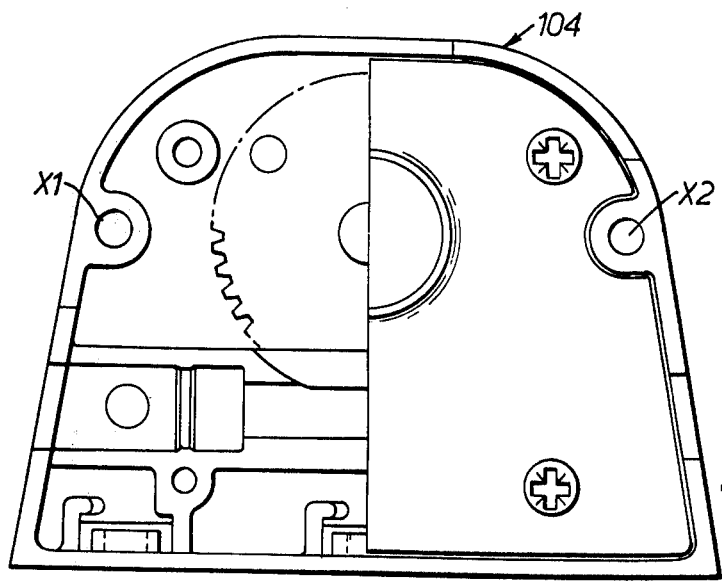
FIG. 16 is a plan view of the drive box shown in FIG. 12 with the cover plate thereof partly removed.
Figure 17:
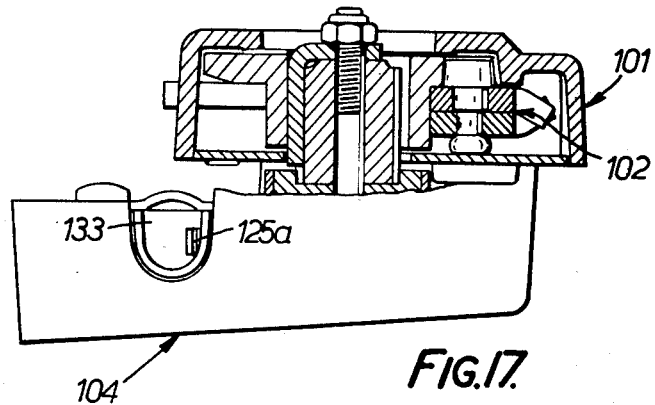
FIG. 17 is a part sectional view corresponding to FIG. 13 but showing the assembly with the chaincase extending to the right when used with a top hung window.
Figure 18:
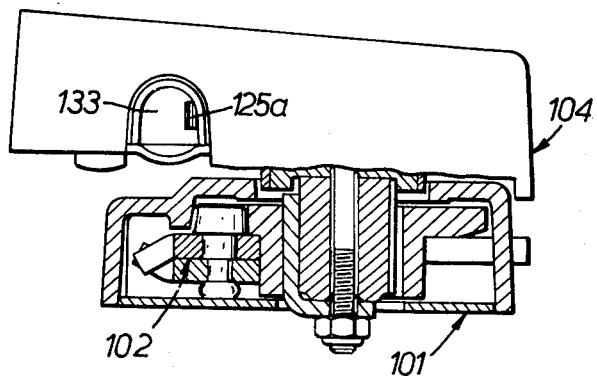
FIG. 18 is a part sectional view corresponding to FIG. 14 but showing the assembly positioned for use with a bottom hung window, i.e., one of the "fall back" type.

The drive box paired holes are referenced A1, A2; B1, B2; C1, C2; and D1, D2 . . . as is shown in FIG. 7. When the chaincase 1 is mounted on the drive box with its holes H1, H2 (see FIG. 1) registering with the holes A1, A2 respectively, then the path followed by the chain as it emerges from the chaincase will be that denoted by reference A in FIG. 7. If reference is now made to FIG. 8, it will be seen that the corresponding position of the assembly shown therein gives the drive box 4 directly mounted on a fixed frame 37 with the chaincase 1 extending to left. so that the output run of the chain 2 emerges into the plane of that figure. The standard terminal link of the chain would be connected to a special link 2a (as in the manner of the chain in the aforementioned patent) which is suitably attached to a bracket 38 affixed to the top hung moving window frame 39. The drive helical cable 32 enters the drive box from the right hand side, and the result is that translation of that cable in the direction indicated by the arrow will rotate the drive pinion 25 and hence through the tubular member 21 and the coupling member 29 the sprocket 19 in an anticlockwise direction causing the chain to move outwardly and so open the window. When the window is required to be shut, the cable 32 would be urged in the opposite direction to that indicated by the arrow.

When the assembly is to be used with a top hung window (as before) but with a drive cable 32 coming from the left hand side . . . as is shown in FIG. 9 . . . then the drive box 4 would be mounted as before on the fixed frame 37 but the chaincase would be turned over through 180° so that is case section 6, which in FIG. 8 abuts the drive box, is now uppermost, it being the case section 5, previously as the top, which now abuts the drive box. The corresponding position in FIG. 7 gives the chaincase holes A1, A2 in register with the drive box holes B1, B2 respectively, and the output of the chain following the path B. In that position, and referring again to FIG. 9, translation of the chain along the direction of the arrow, will rotate the rotational components of the assembly in a clockwise direction and hence cause the chain to move outwardly to open the window, and vice versa when the chain is subjected to a pull (rather than a pushing force).

It will be realized that although the chaincase has been turned over from the FIG. 8 to the FIG. 9 attitude, that the coupling member 29 still lies uppermost. The reason for this is that the coupling member has been released from the tubular member and replaced, when the chaincase is in its new position, in the opposite end of the hollow sprocket 19 which has its rectangular 'incremental adjustment' grooves fashioned throughout its axial length.

The same chaincase 1 and drive box 4, as has been said, can be used with a bottom hung window. In this case, however, with the drive box secured to the fixed window frame 37 (this time by means of a mounting plate 40 rather than direct to that frame, as before), the output run of the chain 2 emerges out of that plane of the drawing, whether the assembly is to be used with a drive cable running from the right (as in FIG. 10) or the left (as in FIG. 11). To achieve that attitude of the chain, the chaincase must be turned through 180° about its longitudinal axis from that position it occupies with the top hung window . . . and so also must the drive box so that its face 41 previously lowermost is the uppermost face.

With the bottom hung window having the drive cable coming from the right, the chaincase holes H1, H2 (referring again to FIG. 7) register with the drive box holes C2, C1 respectively, and the output of the chain follows path C. Thus, as the cable is pulled, in the direction indicated by the arrow in FIG. 10, the rotational components are rotated clockwise so that the chain is urged outwardly to open the window. As will be seen, a bracket 42 is used to couple the chain bracket 38 to the moving frame 39. It will also be appreciated that the coupling member 29 is entered into the same end of the hollow sprocket as in the FIG. 8 use.

Finally, the fourth mounting position of the chaincase on the drive box is obtained for the bottom hung window, left hand entry drive cable, as shown in FIG. 11. Here, the chaincase is turned 180° (from its FIG. 10 position) so that it extends to the right of the drive box. The chaincase holes H1, H2 now register (see FIG. 7) with the drive box holes D2, D1 respectively, and the output of the chain runs along path D. As the cable is pushed in the direction of the arrow of FIG. 11, the rotational components are rotated anti-clockwise to urge the chain and hence the moving window frame outwards to open the window. The coupling member 29 is entered into the same end of the hollow sprocket as in the FIG. 9 use.

The drive box 4 has permanently retained captive nuts 43 by which to be bolted direct to the fixed window frame 37 or to the mounting plate 40, as the case may be.

All the various components of the chaincase 1 and the drive box 4 are preferably of metal, including the housings 21, 22, the drive pinion (of steel) 25, the tubular member 21, the coupling member 29 and the sprocket 19, which makes for a strong assembly.

Referring now to FIGS. 12 to 18, to shorten the present disclosure thereof, the second window opening and closing assembly will be described primarily only insofar as it differs from that of the first embodiment.

Unlike the previous construction, the chaincase 101 (which is again permanently assembled) is fashioned to accomodate not just two runs of the stored drive chain 102, as before, but three runs, such runs being individually denoted by numerals 102a, 102b, 102c. By that construction the chaincase 101 is made of greater depth than hitherto (to accept the three runs side-by-side) but can be of reduced length if it is to accomodate the same length of chain as a chaincase structured for only two chain runs. In the present embodiment, increasing the depth of the chaincase has resulted in the assembly of chaincase and drive box, when mounted for operation, having a rather more aesthetically pleasing appearance than afforded by our previous construction.

The chain 102 is similar to that in the first embodiment but, in this instance, is guided all along its length in a continuous guide channel 116 each run of which is defined between opposite walls 117, 118 which are upstanding of and integral with the lower case section 106. It has been found not necessary to provide an 'upper' guideway, as before, and hence the chaincase is completed by a flat plate constituting the upper case section 105. The reason why the 'upper' guideway is able to be dispensed with is that it is the heads 114a of the chain rivets 114 which when guided provide all the guidance necessary for the chain, the upper rivet ends 114b merely needing clearance from the upper case section 105 in order not to inhibit translation of the chain.

The construction of the chaincase 101 is also somewhat simplified in that instead of there being a separate elongate housing, such is made as one, as will have been appreciated by what has been said before, with the upper and lower case sections. Such sections, then, as secured together, constitute the entire chaincase. Mutual securing of the case sections is effected by rivets 107 integral with the lower case section 106 being peended over the flat plate of the upper case section 105.

So that the chain 102 cannot be withdrawn completely from the chaincase 101, a bar 144 is provided across the space 145 between the uppermost leg of the guidewall 117 and the outermost wall 146 of the chaincase 101. That bar 144 is positioned to engage a roll pin 147 carried by the last link in the chain 102 and thereby prevent escape of that link, and hence the entire chain, for the chaincase.

The guide channel 116 leads the forward links of the chain 102 along a path tangential to the teeth 119a of a sprocket 119 which is mounted for rotation within the chaincase 101 and which, upon being rotated, engages the rivet heads 114a to drive the chain out of, or into, the chaincase 101.

The chaincase 101 can be mounted in the four different positions upon the drive box 104 as described in our previous application, it having the holes H1, H2 through its case sections 105, 106 through which a pair of self tapping screws 136 extend to engage in the suitably positioned holes X1, X2 in the drive box.

Since the holes H1, H2 are on a horizontal centre line passing through the axis of the sprocket 119, the necessity for having four pairs of matched holes in the drive box (to cater for the four different orientations of the chaincase thereon) is obviated, the two holes X1, X2 being sufficient.

Again, in each of those four different positions, the sprocket 119 can, as in the previous embodiment, be engaged to drive means of the drive box 104.

In this instance, the drive means takes the form of a drive pinion 125 rotatably mounted within the drive box 104 which comprises a lower housing 122a to which an upper housing 122 in the form of a cover plate is attached by self tapping screws 122b. The lower housing includes an integral upstanding bearing boss 148, and the plate 122 is fashioned with an upstanding bearing rim 149. The drive pinion 125 rotatably seats at its counterbore 150 on the bearing boss 148 and also has an upper shank region 151 journalled within the bearing rim 149.

The shank region 151 includes a recess 152 fashioned to drivingly mate with an externally splined drive shaft 121 which projects into the (hollow) chaincase sprocket 119 and is drivingly interconnected thereto by means enabling, as before, the incremental rotational adjustment between those components to be made and which function similarly to those corresponding means in our aforementioned application No. 22730/72.

Here, the rectangular grooves, referenced 121a, are the spline grooves of the drive shaft 121. The rectangular grooves, referenced 119a of the sprocket 119, are provided in its interior periphery, and a coupling member 129 has a square section peg 130 which is located within whichever pair of grooves 121a, 119a are aligned with one another during the adjustment procedure, thereby to lock the drive shaft and the sprocket for rotation as one.

The coupling member 129 also is fashioned as a ring 129a at its upper end to be slipped over the shank of a bolt 153 which is welded at 154 to the drive shaft 121 and which serves to hold the described drive unit positively together in conjunction with the complementary nut 154a which engages the ring. As will be appreciated, when the nut 154a is removed, the coupling member 129 can be withdrawn to permit incremental rotational adjustment between the drive pinion 125 and the sprocket 119. The head 153a of the bolt 153 is hexagonal and the base of the pinion counter bore 150 receiving that head is fashioned likewise.

The drive pinion 125 has its gear teeth 125a in engagement with the helically wound cable core 32 of the push-pull control cable housed in a channel 133 provided in the upper and lower housings 122, 122a of the drive box.

Again, all the various components of the chaincase and the drive box are preferably of metal. The sprocket, drive pinion and drive shaft are all sintered iron components, and the lower chaincase section together with the drive box lower housing are die cast in aluminium alloy. The general construction is such as to lend itself to a cost saving in production as compared with the previous embodiment.

In the described and illustrated embodiments, the drive box employs a direct pinion drive from the helical wound inner cable to the chain sprocket via the incremental adjustment mechanism. Various alternative drives are available. Thus, for example, the pinion drive could be geared to reduce loads in the drive cable. In one possible geared arrangement, the drive pinion is not in direct mesh with the drive cable, but instead meshes with a smaller second pinion itself mounted on a common shaft with a cable drive wheel (similar to the drive pinion) acted upon by the helical cable. That shaft would be journalled at its upper and lower ends in the upper and lower housings of the drive box.

Another drive arrangement utilizes a worm and wormwheel drive between the sprocket and the drive pinion. In this instance, the drive pinion is not in direct drive with the tubular member (rotatable about a vertical axis) but, instead, is rotatable about a horizontal axis (whilst still being engaged with the helical cable) and is rotationally fast with a worm which meshes with a wormwheel itself rotationally fast with the lower end of the vertical tubular member.

It will be realized that the permanently assembled chaincase of each embodiment could be sold as a separate unit for assembly to the drive box, i.e., the two units need not necessarily be retailed as a complete package.

Whilst the various constructional features of each embodiment have been described in relation to all being incorporated in one and the same assembly, apart from the different drive arrangements, it should be understood that each of the features, where practicable, could alone or in combination with any other suitable one of the features be used in a single assembly.

It should also be realized that the chaincase whether constructed to store either a relatively long chain (for normal depth windows) or a relatively short chain (for shallow depth windows) can be interchangably fitted to a drive box constructed as hereinbefore described whether with a direct drive from the cable wheel to the chain sprocket or an indirect drive, whether employing a gear drive in the form of a second pinion or a worm and wormwheel drive.

What we claim is:

1. A mechanism for opening and closing an angularly movable panel, comprising a drive box for attachment to a fixed frame, the drive box housing a cable wheel rotatable upon translation of a control cable when in operative association therewith, a chaincase having a sprocket operatively connected with a chain located in a casing, the chain being for attachment at one end to an angularly movable panel, rotation of the sprocket effecting translation of the chain into, or out of, the casing in accordance with the sense of sprocket rotation, the chaincase having similar opposite connections for being mountable in any of four different positions on the drive box as is determined by use of the mechnism with
    a. a panel of the bottom hung type with a control cable approaching the mechanism from the right hand side,
    b. a panel of the bottom hung type with a control cable approaching the mechanism from the left hand side,
    c. a panel of the top hung type with a control cable approaching the mechanism from the right hand side,
    d. a panel of the top hung type with a control cable approaching the mechanism from the left hand side
and in each of these positions having its sprocket in drivable communication with the cable wheel without the necessity of disassembling the chaincase and reorienting the positions of the sprocket and chain.

2. A mechanism as claimed in claim 1, wherein the sprocket has a cylindrical bore at which to be mounted from either end on a rotational component in a drive connection from the cable wheel to the sprocket.

3. A mechanism as claimed in claim 2, wherein the sprocket is drivingly coupled to the rotational component by means enabling an incremental rotational adjustment between the sprocket and the component to be obtained.

4. A mechanism as claimed in claim 3, wherein the incremental rotational adjustment means comprise a series of grooves in the wall of the sprocket bore and in the outer periphery of the rotational component, and a coupling member shaped to engage in any selected pair of such grooves when in register with one another.

5. A mechanism as claimed in claim 4, wherein the rotational component is drivingly interconnected with a drive pinion of the drive box by spline means the spline grooves of which in the rotational component serve as the grooves for receiving the coupling member.

6. A mechanism as claimed in claim 5, including a bolt and nut means securing the rotational component to the drive pinion, the coupling member comprising a peg for engaging in a pair of registered grooves and a ring at one end of the peg fitting around the shank of the bolt means.

7. A mechanism as claimed in claim 5, wherein the drive pinion constitutes said cable wheel.

8. A mechanism as claimed in claim 5, wherein the drive box comprises a pair of housing parts coupled together, one such housing part having a bearing boss, the drive pinion rotatably seating on the bearing boss, and the other such housing part having an upstanding bearing rim within which a shank region of the drive pinion is journalled.

9. A mechanism as claimed in claim 8, wherein said one housing part is a die cast component, and the other housing part is a cover plate.

10. A mechanism as claimed in claim 1, wherein the drive box and the chaincase casing are each provided with a pair of apertures located at the same radial distance from the axis of rotation of the sprocket and diametrically opposite one another so that in each of said four mounting positions of the chaincase on the drive box the apertures of the chaincase casing register with the apertures of the drive box, and including means for location in each pair of registered apertures by which to fasten the drive box and the chaincase together.

11. A mechanism as claimed in claim 1, wherein links of the chain are connected together by pin means having at one end drive heads in driven engagement with the sprocket, the chaincase casing being provided with a guide channel within which said drive heads locate thereby to guide the chain as it is translated, the guide channel being fashioned to accommodate three runs of the chain side-by-side.

12. A mechanism as claimed in claim 11, including bar means across the guide channel to engage a pin carried by the last link of the chain by which to prevent complete withdrawal of the chain from the chaincase.

13. A mechanism as claimed in claim 11, wherein the casing comprises a pair of case sections secured together, one such case section being a die cast component and being fashioned with said guide channel, and the other case section being a plate.

14. A mechanism as claimed in claim 13, including rivets integral with the die cast case section and peened over the plate case section to secure the case sections together.

15. A mechanism as claimed in claim 5, wherein the sprocket, the rotational component and the drive pinion are sintered iron components.

16. A mechanism as claimed in claim 1, wherein the cable wheel is in a direct drive relationship with the sprocket.

17. A mechanism as claimed in claim 1, including a geared drive from the cable wheel to the sprocket.

18. A chaincase comprising a casing having located therein a drive sprocket and a chain in driven connection therewith, the drive sprocket having a cylindrical bore extending completely therethrough by which the chaincase can be mounted with one side thereof uppermost or lowermost on a complementary drive component.

19. A vent opening and closing mechanism comprising a chaincase housing a sprocket and constructed to store one of a relatively long and a relatively short chain driven by the sprocket, and a drive box housing a cable wheel rotatable by translation of a cable when in operative association therewith, the drive box being constructed to provide a drive from the cable wheel to the sprocket, the chaincase when constructed with one of the relatively long and short chains being interchangeably fittable with the drive box constructed with the drive from its cable wheel to the chaincase sprocket.

* * * * *